United States Patent
Stoops et al.

(10) Patent No.: US 12,450,146 B2
(45) Date of Patent: Oct. 21, 2025

(54) KEYPAD HEALTH AND DIAGNOSTICS SYSTEM AND PROCESSES

(71) Applicant: KRS CORPORATION, LLC, Louisburg, KS (US)

(72) Inventors: Kevin Ray Stoops, Bucyrus, KS (US); Randolph Cook, Spring Hill, FL (US)

(*) Notice: Subject to any disclaimer, the term of this patent is extended or adjusted under 35 U.S.C. 154(b) by 70 days.

(21) Appl. No.: 18/142,018

(22) Filed: May 1, 2023

(65) Prior Publication Data

US 2023/0350781 A1 Nov. 2, 2023

Related U.S. Application Data

(60) Provisional application No. 63/336,524, filed on Apr. 29, 2022.

(51) Int. Cl.
| G06F 3/01 | (2006.01) |
| G06F 11/07 | (2006.01) |
| G06F 11/34 | (2006.01) |
| G06F 3/023 | (2006.01) |

(52) U.S. Cl.
CPC ...... G06F 11/3476 (2013.01); G06F 11/0745 (2013.01); G06F 11/3438 (2013.01); G06F 3/01 (2013.01); G06F 3/0238 (2013.01)

(58) Field of Classification Search
CPC .. G06F 11/3476; G06F 21/83; G06F 11/0745; G06F 11/3438; G06F 3/01; G06F 3/0219; G06F 3/0238
See application file for complete search history.

(56) References Cited

U.S. PATENT DOCUMENTS

| 3,973,256 | A | * | 8/1976 | Stoesser | H03M 11/20 341/24 |
| 4,193,038 | A | * | 3/1980 | Kashio | G10H 1/182 327/414 |
| 5,579,238 | A | * | 11/1996 | Krugman | G01H 1/00 702/56 |
| 6,052,116 | A | * | 4/2000 | Takagi | G06F 3/0231 345/169 |
| 6,181,262 | B1 | * | 1/2001 | Bennett | G06F 3/023 341/26 |
| 2012/0284573 | A1 | * | 11/2012 | McCallum | G06F 3/0418 714/57 |
| 2013/0031422 | A1 | * | 1/2013 | Church | G06F 11/008 714/E11.197 |
| 2013/0044063 | A1 | * | 2/2013 | Kim | G06F 3/04886 345/173 |

(Continued)

FOREIGN PATENT DOCUMENTS

CN 204102076 U * 1/2015 ............. H01H 13/83

OTHER PUBLICATIONS

Wikipedia's API historical version published Apr. 26, 2022 https://en.wikipedia.org/w/index.php?title=API&oldid=1084801516 (Year: 2022) (Year: 2022).*

(Continued)

Primary Examiner — Joseph O Schell
(74) Attorney, Agent, or Firm — Kutak Rock LLP; Brian L. Main (57) ABSTRACT

A method of determining keypad health is provided. The method includes identifying the frequency of signals associated with the keypad and providing a warning when the frequency reaches a threshold value.

19 Claims, 4 Drawing Sheets (56) References Cited

U.S. PATENT DOCUMENTS

2018/0336539 A1\* 11/2018 Upasani ............ G06Q 20/1085
2023/0185291 A1\* 6/2023 Morrison ............ G06F 11/3051
700/96

OTHER PUBLICATIONS

"How does an event listener work?" by Stackexchange.com (herein StackExchange) https://softwareengineering.stackexchange.com/questions/363397/how-does-an-event-listener-work Jan. 2018 (Year: 2018) (Year: 2018).\*

\* cited by examiner

KEYPAD HEALTH AND DIAGNOSTICS SYSTEM AND PROCESSES

CROSS-REFERENCE TO RELATED APPLICATIONS

This application claims priority to U.S. Provisional Patent application Ser. No. 63/336,524, filed Apr. 29, 2022, the entire disclosure of which is incorporated herein by reference. This application incorporates by reference U.S. Pat. No. 10,936,087 for KEYBOARD ASSEMBLY.

FIELD OF THE INVENTION

The present invention relates generally to computer user interfaces that are particularly well-suited for use in quick serve restaurant environments. More specifically, the present invention relates to a method of identifying and mitigating keypad failures and facilitating opportune replacement of keypads.

BACKGROUND

Quick serve restaurants utilize many computers for purposes such as inputting orders at a counter and/or completing food orders in a kitchen. Many of the computers include a PS/2, serial, USB or other similar style input interface. The input interface (keyboard) typically includes a small number of keys (compared to a QWERTY keyboard) that includes letters, numbers, symbols or words associated with certain functions of the computer (i.e. inputting a customer's order, inputting completion of the order by a kitchen staff person, etc.). As commercial kitchen environments are typically extremely harsh due to high temperatures, corrosive substances (foods, liquids, etc.), employee usage/abuse, etc., the computer input interface devices are subjected to significant wear and tear.

Many of the input interface devices of the prior art typically include a two-piece metal enclosure shell (front shell half and rear shell half) for a printed circuit board (PCB). The printed circuit board includes connectors for a PS/2 cable that connects to a computer, and for a ribbon cable that connects to a keypad membrane that is mounted to the outer surface of the enclosure. The PS/2 cable extends through a slot in the enclosure and is connected to the computer. Installing (or reinstalling/replacing) the PS/2 cable includes disassembling the two halves of the enclosure shell and inserting the cable into the slot in the side of one of the halves of the shell. Due to the design of such prior art metal enclosures, this is a time consuming process, and can result in damage to the PCB. To overcome disadvantages with the prior art enclosures, the instant inventor developed the enclosures of U.S. Pat. No. 9,016,965 (the "'965 Patent") and U.S. Pat. No. 10,936,087 (the "'087 Patent"), the entire disclosures of which are incorporated herein by reference. While the enclosures of the '965 Patent and the '087 Patent provide many advantages over the enclosures of the prior art, many restaurants would still prefer to avoid replacing keypads during inopportune times, such as during a lunch rush.

Keypads tend to fail during busy times, such as during a lunch rush, due to the high frequency of use during such times. For obvious reasons, replacing a keypad during a lunch rush is inconvenient and sometimes impossible. For instance, the necessary personnel and/or the necessary equipment may not be available to make the change. Even if the necessary personnel and the necessary equipment are available, the interruption associated with replacing a keypad during the lunch rush may be unacceptable or highly undesirable. Accordingly, it would be beneficial to have a system for and a method of determining the health of a keypad so that a worn keypad can be replaced prior to its failure, thereby facilitating replacement of the keypad during opportune times, such as during slow times.

In response to a single engagement of a single button, a healthy keypad generates a single signal. As the keypad begins to wear, the keypad tends to generate excess signals. Accordingly, it would be beneficial to have a system for or a method of determining the number of signals generated for each engagement of a button.

SUMMARY

The instant invention provides a system and method for determining keypad health, thereby facilitating replacement of the keypad prior to failure of the keypad. In this way, the present invention facilitates replacement of the keypad during opportune times, such as during slow times, while also decreasing the likelihood that a keypad will fail during inopportune times, such as during busy times. Furthermore, the present invention mitigates the negative effects of failing keypads by filtering extraneous signals sent by failing keypads.

The current invention includes a system for and a method of determining a number of signals generated by a keypad, thereby facilitating a determination of the number of signals generated for each engagement of a button of the keypad.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIGS. A-1 thru A-9 show exemplary screens of information associated with certain embodiments of the present invention.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention includes a system for and a method of determining keypad health based on the number of signals generated by the keypad. The keypad may include any number of buttons, each of which can be selectively engaged by a user. Each button can generate a signal upon engagement. It will be appreciated that the present invention can be utilized with keypads having various button configurations. In some embodiments, the keypad includes a unique serial number and geographic location data.

In some embodiments, the keypad generally includes various buttons, a power source, a processor, and one or more types of data connection ports. In some embodiments, the keypad is capable of running a computer program. In some embodiments, the keypad includes a memory element for storing data. In some embodiments, the memory element includes a non-transitory computer-readable storage medium, and in some such embodiments this includes random access memory (RAM). In some embodiments, the memory element includes long term data storage.

The buttons of the keypad are configured to generate a signal when pressed by a user. In some embodiments, the signal includes a sequence of characters and/or operations. In some embodiments, the sequence is preprogrammed by the keypad user. When the keypad is healthy, engagement of a button will generate one intentional signal. As the keypad health fades, engagement of a button may erroneously generate multiple signals.

In one embodiment, the keypad is connected to and serves as an input device for a computer, such as a computer at a restaurant, wherein a user of the keypad, such as a restaurant employee, utilizes the keypad to update or otherwise interface with the computer, such as by inputting and/or clearing customer orders.

Figure 1:
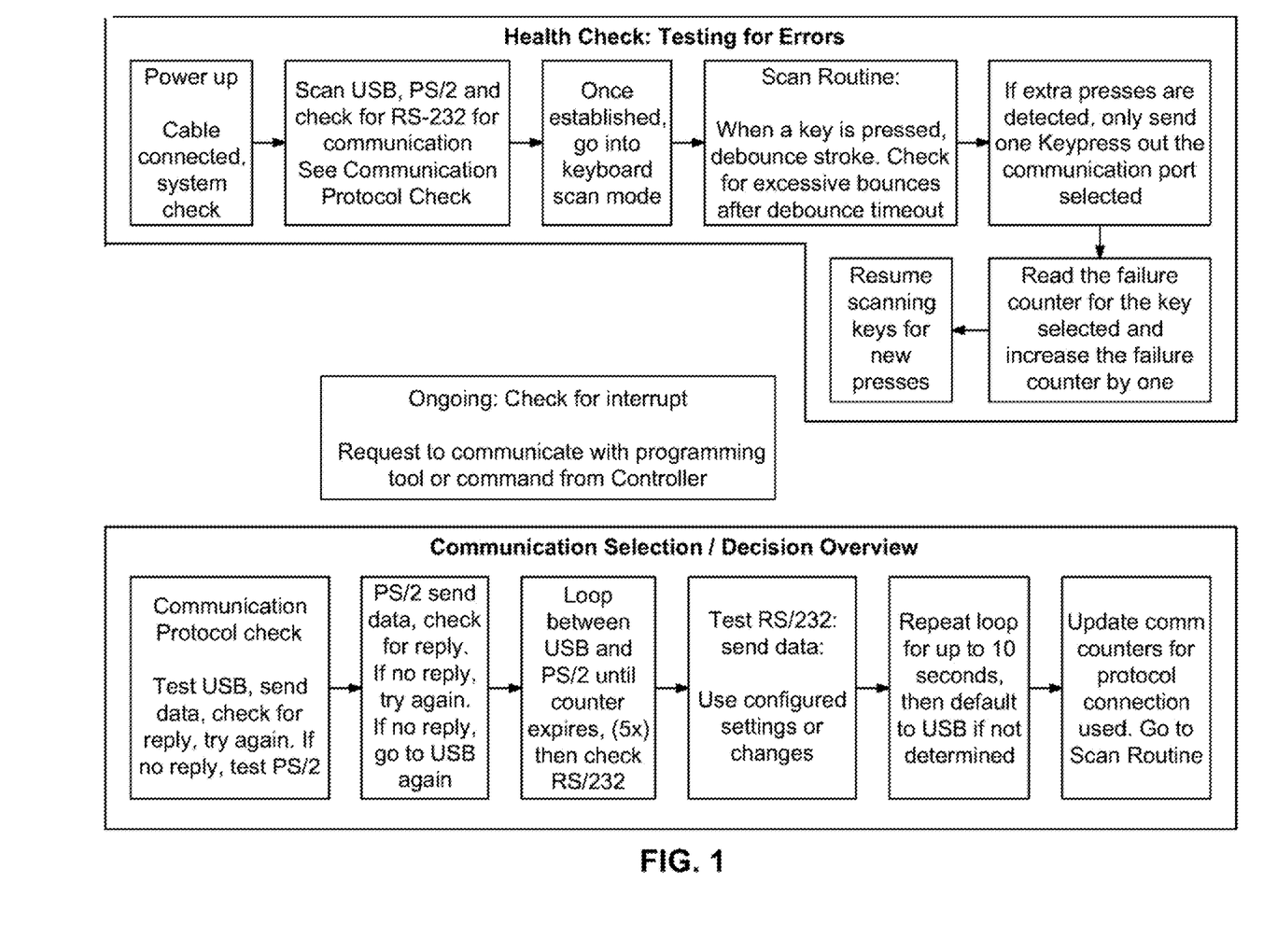
FIG. 1 is a flowchart depicting one embodiment of the systems and methods of the present invention.
Figure 2:
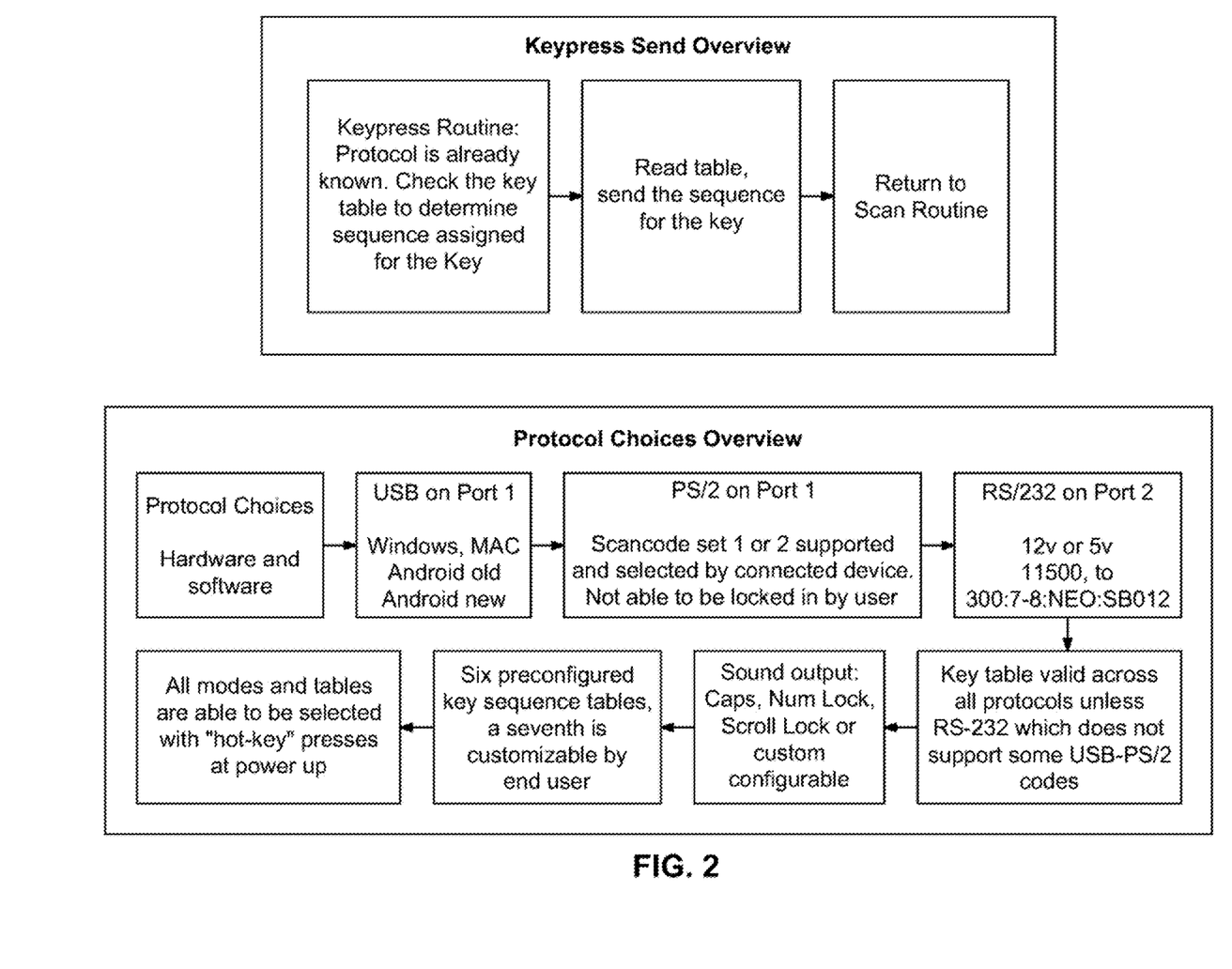
FIG. 2 is a flowchart depicting one embodiment of the systems and methods of the present invention.

Referring to FIGS. 1 and 2, in some embodiments, upon connecting a keypad to a host device and powering up the keypad, the present invention runs a communication protocol check. The communication protocol check establishes a communication port from the keypad to a host device. In some embodiments, the host device includes hardware, such as a desktop computer, laptop computer, tablet computer, mobile phone, PDA, or another similar computing device. In some embodiments, the host device includes software, such as Microsoft Windows, macOS, ChromeOS, iOS, Linux, Android, Unix, Ubuntu, or other similar operating systems. In some embodiments, more than one keypad is connected to the same host device. In one embodiment, the keypad(s) is/are connected to a host computer at a restaurant, wherein restaurant employees input and clear customer orders via the keypad(s).

As seen in FIGS. 1 and 2, the communication protocol check detects the hardware and software of the host and chooses the connection type. In some embodiments, the system of the present invention utilizes USB protocol, PS/2 protocol, RS232 protocol, or the like.

In some embodiments of the present invention, once a connection is established via the communication protocol check, the system enters keyboard scan mode. The system monitors the keypad to detect any key (also referred to as "button") presses. In some embodiments, once a button is pressed by a user, the system runs a health check.

In some embodiments, the health check includes monitoring the number of signals generated when the button is pressed. If extraneous signals are generated from a single button press, the system documents the occurrence as an indication of a single error. By documenting errors, the system is capable of determining when the keypad is in bad health and/or nearing failure. In some embodiments, when the present invention detects a signal associated with a particular button, it first records that the button was pressed. Next, in some embodiments, the system monitors for additional signals associated with that same button over a successive time period. This successive time period is typically short, for example 50 ms. This is to ensure the additional signals are extraneous rather than a second press of the same button. If additional signals from the same button are detected during this short time period following the initial signal, the extra signals are logged as errors rather than additional inputs. In some embodiments, the errors are logged in a data storage element inside the keypad.

For example, if the system detects a plurality of "X" button signals over a short period of time, such as over 50 ms, the system interprets the plurality of "X" button signals as a single press of the "X" button and a single error associated with the "X" button. If, for example, the plurality of signals is five, some embodiments of the present invention will log the first signal as an input while the remaining four signals are logged as a single error. In other words, the system determines that the "X" button was not pressed four more times, but instead there was a failure with the associated button on the keypad and the button erroneously generated extra signals. Despite the five total signals, the system will log just one "X" button press along with an error.

In some embodiments, the time period for monitoring successive signals is 50 ms. In some embodiments, the time period is less than 50 ms. In some embodiments, the time period is set to more than 50 ms. In some embodiments, an error will be logged with one extra signal. In some embodiments, a higher threshold is set. For example, in some embodiments, an error will not be logged unless two or more extra signals are received. In some embodiments, the magnitude of the error is logged. For example, one extra signal may be a lower magnitude error, while ten extra signals may be a high magnitude error. It will be appreciated that different values may be set by the operator and/or a programmer.

In some embodiments, the system detects the signals before sending any information from the keypad to the host. In these embodiments, the system is able to "catch" or filter out the extra signals. In other words, if extraneous signals are detected as described above, the system will only send one signal through the communication port to the host. The system will prevent the keypad from transmitting the extra signals.

In some embodiments of the present invention, the system monitors and records errors and failures relating to the powering of the keypad. This includes monitoring keypad power on/off cycles, average run time per cycle, and total run time. For example, numerous short power cycles can indicate a failure with the power. Changes in these numbers over time can also indicate a failure. In some embodiments, the system monitors these incidents and logs the errors. In some embodiments, the errors are logged and stored in a data storage element inside the keypad.

In some embodiments of the present invention, the system monitors and records errors and failures relating to the communication port. This includes monitoring the number of unique connections made to the host and the type of connection made. Numerous repeated connections to the host can indicate that the connection is being repeatedly lost.

In turn, this can indicate a failure with the communication port. In some embodiments, the system monitors these incidents and logs the errors. In some embodiments, the errors are logged and stored in a data storage element inside the keypad.

In some embodiments, the present invention includes a listening Application Programming Interface (a listening "API") to receive the error logs and other data. In some embodiments, the listening API is in data communication with the keypad. In some embodiments, the keypad may push data to the listening API, such as when there is an error. In some embodiments, the listening API may pull data from the keypad. In some embodiments, the listening API is installed on the host system. In some embodiments, the listening API is installed on a separate, upstream system. In some embodiments, the listening API may be installed in multiple locations.

In some embodiments, the upstream system is located onsite, for example, at a restaurant where the keypad is being operated. In some embodiments, the upstream system is located offsite. In some embodiments, the upstream system may be located on the cloud. In some embodiments, the upstream system may be accessible onsite or remotely. It will be appreciated that any commonly known computer or server system may be utilized by the upstream system.

In some embodiments, the data sent to the listening API includes the serial number and geographic location data of each keypad. In some embodiments, this data includes other various usage data as described in detail below. Using this data, the system of the present invention is able to identify a specific keypad at a specific location that needs replacing.

In some embodiments, the total number of errors is used to determine overall keypad health. In some embodiments, the frequency of errors is used to determine overall keypad health. In some embodiments, the magnitude of the error(s) is used to determine overall keypad health.

In some embodiments, the present invention will notify the keypad operator that a keypad has low health via an audio alert. In some embodiments, the audio alert is produced by a speaker connected to the host, the upstream system, or the keypad. In some embodiments, the present invention will notify the operator that a keypad needs replacing via a visual alert. In some embodiments, the present invention will notify a user of the upstream system that the keypad has low health. It will be appreciated that the present invention can alter the keypad operator and upstream system user in any manner of commonly known ways. This alert allows the unhealthy keypad to be proactively replaced.

In some embodiments, such as when the upstream system is located offsite, notification can be sent to a third party indicating the keypad needs replacement without the operator of the keypad being notified. In this case, a third party, such an employee in a different department, a service technician, etc., can replace the unhealthy keypad before the keypad operator learns of the error.

In some embodiments, the present invention monitors and records certain kinds of usage data associated with one or more keypads in operation. In some embodiments, the usage data is stored in a data storage element inside the keypad. In some embodiments, usage data is pushed from the keypad to the listening API. In some embodiments, the listening API may be used to pull usage data from the keypad. In some embodiments, the usage data may be directly downloaded from the keypad to another device. In this embodiment, for example, a technician may download the usage data to evaluate the health of the keypad directly.

In some embodiments, usage data includes the operational time of a particular keypad, such as the number of days in operation and the average operational length each day. In some embodiments, usage data includes the total run time of a particular keypad, the number of on/off cycles for a particular keypad, the average time connected to the host, and type of host connection. In some embodiments, usage data includes information identifying the particular keypad. In some embodiments, usage data includes geographic location information. In some embodiments, usage data includes graphically presented data.

In some embodiments, usage data includes the total amount of unique days a keypad was in operation. If the keypad is powered on once during a particular day, that day would be counted as one operational day. Subsequent power cycles during the same day would not add to the count. In some embodiments, usage data includes the operational length for each particular operational day. The operational length is the amount of total time during the operational day that the keypad was powered on. In some embodiments, usage data includes the average operational length per operational day.

In some embodiments, usage data includes the amount of power on/off cycles. In some embodiments, usage data includes the length in time of each power cycle—i.e. the length in time the keypad was powered on. In some embodiments, usage data includes the average powered on period for each power cycle. In some embodiments, usage data includes the total time the keypad has been powered on over all power cycles. This is the total time the keypad has been powered on.

In some embodiments, usage data includes the number of unique connections to the host. In some embodiments, the usage data includes the number of unique connections for each type of connection, such as USB or PS/2 connection.

In some embodiments, usage data includes button usage data. Button usage data includes the total number of buttons on the keypad, the amount of times each button has been pressed, the maximum number of times a button has been pressed, the mean number of button presses, and other similar data. Button usage data includes the number of button failures and the number of other keypad failures, such as power or connection failures.

In some embodiments, the present invention includes a user interface. In some embodiments, the user interface is accessible from the upstream server. In some embodiments, the user interface is accessible from the host. In some embodiments, the user interface is accessible remotely from any computing device with a screen. One embodiment of the user interface of the present invention is shown in FIG. 3.

Figure 3:
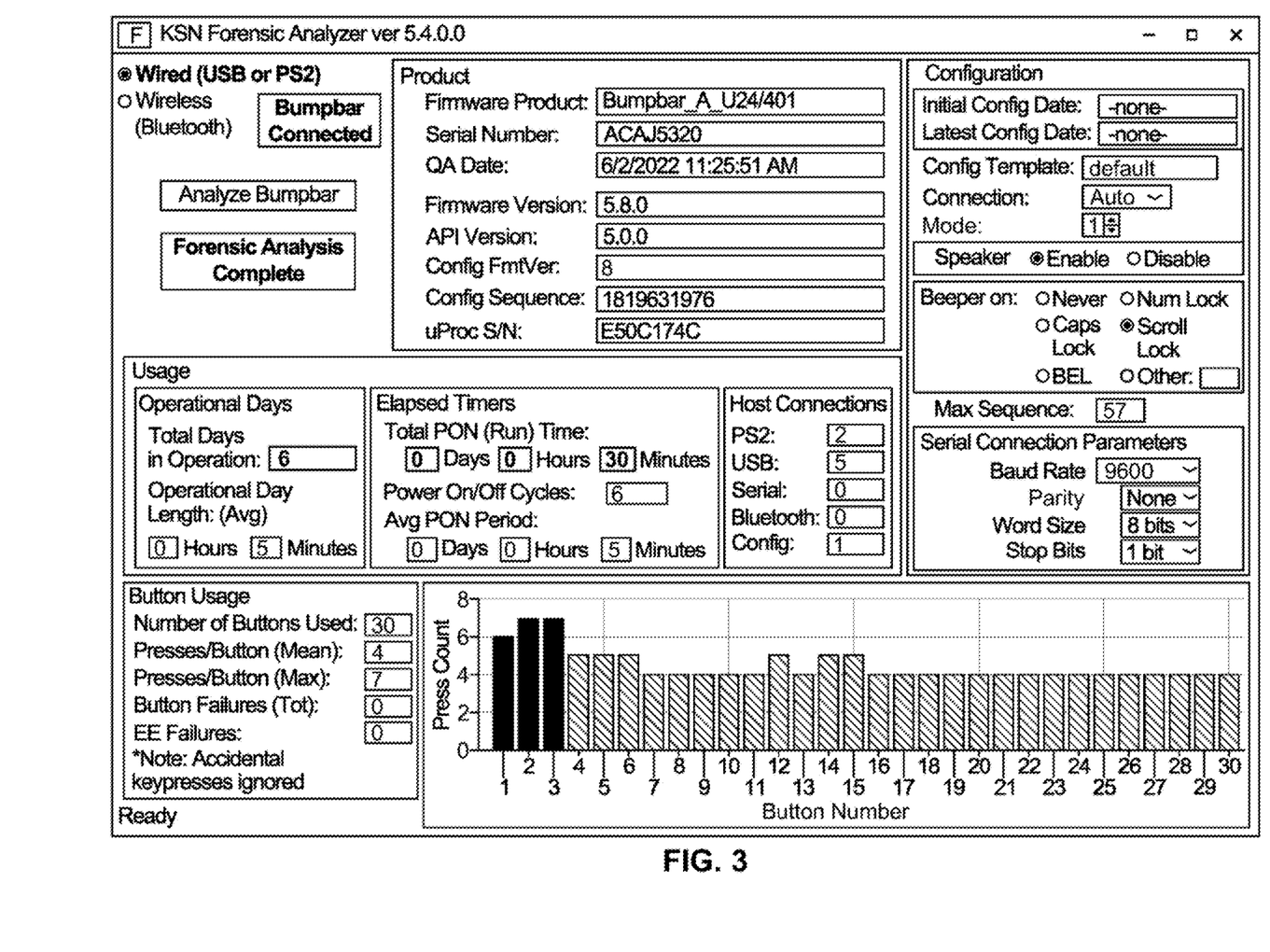
FIG. 3 is an exemplary embodiment of the user interface of the present invention.

As seen in FIG. 3, in some embodiments, the user interface includes identifying information relating to a particular keypad. In some embodiments, identifying information includes the keypads serial number. In some embodiments identifying information includes the keypads product name, firmware version, API version, configuration version, configuration sequence, and/or other such information. In some embodiments, identifying information includes the date of the last quality assurance ("Q/A") check and other Q/A information.

In some embodiments, the user interface is adapted for inputting of various system settings. In some embodiments, QA data, including the most recent QA date, QA history, and QA details, can be input. In some embodiments, configuration data can be input. In some embodiments, the type of host connection can be specified. In some embodiments, the type of alerts, such as audio alerts via speaker, can be specified. In some embodiments, the system settings can be saved as a template. In some embodiments various preset templates can be saved.

While the foregoing describes the present invention in connection with a keypad, it will be appreciated that the present invention can be used in connection with other devices. The present invention may be utilized with any device including buttons, a power cycle, or a connection port.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantages, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A keypad health and diagnostic system, the system comprising:
   a keypad configured to transmit signals, the keypad having a plurality of buttons, each button configured to generate a signal when engaged by a user; and
   a host device in communication with said keypad and configured to receive signals from said keypad,
   wherein a single intentional signal is generated for each button engagement when the keypad is healthy,
   wherein a single intentional signal and a plurality of extra signals are generated for at least some button engagements when the keypad is unhealthy,
   wherein the keypad is configured to distinguish intentional signals from extra signals, and
   wherein said keypad prevents the extra signals from being transmitted to said host device.

2. The system of claim 1, wherein said keypad logs an error in an error log when extra signals are detected following a button engagement.

3. The system of claim 2, wherein the system further comprises a listening API.

4. The system of claim 3, wherein said keypad transmits the error log to said listening API.

5. The system of claim 4, wherein said listening API generates an alert upon receipt of an error log.

6. The system of claim 1, wherein the keypad records and stores usage data.

7. The system of claim 6, further comprising a user interface configured to provide access to said usage data.

8. The system of claim 7, wherein said user interface is further configured to receive an input of system settings.

9. The system of claim 6, wherein the system further comprises a listening API configured to pull usage data from said keypad.

10. A method for diagnosing keypad health, the method comprising:
    monitoring a first keypad having a plurality of buttons, wherein a single intentional signal is generated for each user engagement with a button when the first keypad is healthy, and wherein a single intentional signal and a plurality of extra signals are generated for at least some button engagements when the first keypad is unhealthy;
    distinguishing intentional signals from extra signals;
    logging an error in an error log when an extra signal is detected;
    reporting the error log to a listening API installed on an upstream system;
    establishing communication between said first keypad and a host device configured to receive signals from said first keypad;
    logging each of the extra signals as a separate error; and
    preventing the extra signals from being sent to the host device,
    wherein the listening API is configured to monitor a plurality of keypads, and
    wherein the error log reported to the listening API comprises identifying data of said first keypad configured to identify said first keypad.

11. The method of claim 10, wherein said first keypad is located at a first site and wherein said upstream system is located at a second site at least partially displaced from said first site.

12. The method of claim 10, further comprising the step of recording usage data associated with said first keypad.

13. The method of claim 10, further comprising the step of determining the first keypad health based upon the error log.

14. A method for diagnosing keypad health, the method comprising:
    monitoring a first keypad having a plurality of buttons, wherein a single intentional signal is generated for each user engagement with a button when the first keypad is healthy, and wherein a single intentional signal and a plurality of extra signals are generated for at least some button engagements when the first keypad is unhealthy;
    distinguishing intentional signals from extra signals;
    logging an error in an error log when an extra signal is detected;
    reporting the error log to a listening API installed on an upstream system;
    logging a plurality of the extra signals as a single error; and preventing the first keypad from transmitting the extra signals, wherein the listening API is configured to monitor a plurality of keypads, and wherein the error log reported to the listening API comprises identifying data of said first keypad configured to identify said first keypad.

15. The method of claim 14, wherein said first keypad is located at a first site and wherein said upstream system is located at a second site at least partially displaced from said first site.

16. The method of claim 14, further comprising the step of recording usage data associated with said first keypad.

17. The method of claim 14, further comprising the step of determining the first keypad health based upon the error log.

18. A keypad apparatus, the apparatus comprising:
a processor;
a storage medium;
a communication port configured to transmit signals; and
a plurality of buttons configured to generate a signal when engaged by a user, wherein a button generates a single intentional signal for each user engagement when the keypad is healthy, wherein a button generates a single intentional signal and a plurality of extra signals for at least some button engagements when the keypad is unhealthy, wherein the keypad is configured to distinguish intentional signals from extra signals and log an error in an error log on the storage medium when an extra signal is detected, and wherein said keypad is further configured to prevent extra signals from being transmitted by the communication port.

19. The system of claim 18, wherein said keypad is further configured to transmit the error log to a monitoring device, and wherein the error log comprises identifying data of said keypad apparatus configured to identify said keypad apparatus.

* * * * *